United States Patent
Yamashita et al.

[11] Patent Number: 5,315,381
[45] Date of Patent: May 24, 1994

[54] COLOR IMAGE FORMING APPARATUS

[75] Inventors: Haruo Yamashita, Osaka; Hideshi Ishihara, Takatsuki; Yasuki Matsumoto, Nishinomiya, all of Japan

[73] Assignee: Matsushita Electric Industrial Co., Ltd., Osaka, Japan

[21] Appl. No.: 879,455

[22] Filed: May 4, 1992

Related U.S. Application Data

[63] Continuation of Ser. No. 549,938, Jul. 9, 1990, abandoned.

[30] Foreign Application Priority Data

Jul. 17, 1989 [JP]  Japan ................................ 1-184092
Sep. 18, 1989 [JP]  Japan ................................ 1-241253

[51] Int. Cl.$^5$ .......................... H04N 1/46; G03F 3/08
[52] U.S. Cl. ...................................... 358/500; 358/523
[58] Field of Search ................. 358/75, 80, 461, 401, 358/443, 448, 296; 382/50

[56] References Cited

U.S. PATENT DOCUMENTS

| | | | |
|---|---|---|---|
| 4,534,059 | 8/1985 | Yamada | 358/461 |
| 4,745,467 | 5/1988 | Sekizawa et al. | 358/80 |
| 4,864,392 | 9/1989 | Sato | 358/80 |
| 4,929,978 | 5/1990 | Kanamori et al. | 358/80 |
| 4,977,448 | 12/1990 | Murata et al. | 358/80 |

FOREIGN PATENT DOCUMENTS

| | | |
|---|---|---|
| 0310829 | 4/1989 | European Pat. Off. |
| 0327278 | 8/1989 | European Pat. Off. |
| 3636702 | 5/1987 | Fed. Rep. of Germany |

*Primary Examiner*—Edward L. Coles, Sr.
*Assistant Examiner*—Thomas D. Lee
*Attorney, Agent, or Firm*—Stevens, Davis, Miller & Mosher

[57] ABSTRACT

In order to realize a method of color correction which is capable of performing the UCR compensating for the non-linearity of the superposed densities and the non-linear color correction meeting the non-linearity of the superposed densities at high accuracy with a configuration in substantially the same scale as the conventional linear UCR and linear masking techniques, there is provided a color correction method comprising first conversion means for converting the C, M, Y density information by a monotonously incremental non-linear function with a similarly monotonously incremental derivative, matrix means, and second conversion means for converting the same density information by a monotonously incremental non-linear function with a monotonously decremental derivative. In another aspect, there is provided four-color reproduction means comprising first conversion means for converting the C, M, Y information by a monotonously incremental non-linear function with a similarly monotonously incremental derivative, second conversion means, for effecting the conversion with a monotonously incremental non-linear function with a monotonously decremental derivative, and black separation means, subtraction means and matrix means interposed between the first and second conversion means for controlling the densities of the four inks to implement color recording.

16 Claims, 8 Drawing Sheets

COLOR IMAGE FORMING APPARATUS

This application is a continuation of application Ser. No. 07/649,938, filed Jul. 9, 1990 (abandoned).

BACKGROUND OF THE INVENTION

1. Field of the Invention

The present invention relates to a method of color correction and four-color conversion in an apparatus for recording a full-color image such as a color printer or a color duplicator.

2. Description of the Prior Art

The full-color recording on a hard copy is realized by gradation recording effected for each of a three-color ink including the three colors of cyan (C), magenta (M) and yellow (Y) or four-color ink including four colors with black (K) further added thereto. The gradation recording is roughly divided into a density gradation system typically including the thermal transfer system of sublimation type and the silver salt photography capable of controlling the density within a single dot, and a tone production system by density of each element such as the thermal transfer system of fusion type or the electrophotography for expressing a gradation with a combination of dots by using the integral effect of vision based on dither method or density pattern.

Either method uses the color reproduction on the principle of subtractive color mixture using complementary colors C, M, Y of the three primary colors of R, G, B. Compared with the color reproduction by additive color mixture the sole problem of which is the range of color reproduction by the three primary color but in which the spectral distribution of the color light has no effect on the color reproduction, the color reproduction by subtractive color mixture poses the problem of the spectral distribution of a dye having a great effect on the color reproduction.

In view of the fact that the spectral-absorption characteristic of actual ink has the central wavelength thereof displaced from an ideal form and the wavelength absorption characteristic thereof is so broad that there exists the phenomenon of subsidiary absorption, and the hue of the image recorded is changed to reduce the saturation.

To cope with these problems, the prior art uses a method called masking mainly in the field of printing.

The main densities $c'$, $m'$, $y'$ for the central wavelength of the actual ink set by the linear masking are given by equations (1) below which represent a technique called linear masking and are widely used for their simple configuration.

$$c' = a0^*c + a1^*m + a2^*y$$
$$m' = a3^*c + a4^*m + a5^*y$$
$$y' = a6^*c + a7^*m + a8^*y \qquad (1)$$

The spectral densities $c$, $m$, $y$ in equations (1) are those obtained when the inputs r, g, b are converted for complementary colors and are defined by equations (2) below.

$$c = \log(1/r)$$
$$m = \log(1/g)$$
$$y = \log(1/b) \qquad (2)$$

The nine correction factors a0 to a8 in equations (1) are obtained first by determining a set of main densities ($c'$, $m'$, $y'$) of actual ink for realizing colors in many sets of color patches (c, m, y) and then by minimizing the mean color difference therebetween.

The linear masking expressed by equations (1) implicitly assumes an addition theorem where the sum of density increase due to three amounts of dyes is equal to the increase in each density component, that is to say, the Lambert-Beer theorem concerning the densities in a subtractive color mixture.

In recording with actual ink superposition, however, it is known that such density linearity is not established, and in view of this, there has been proposed a high-order masking technique capable of expressing non-linearity to a certain degree.

Equations (3) represent the simplest secondary masking.

$$c' = a0^*c + a1^*m + a2^*y + a3^*c^2 + a4^*m^2 + a5^*y^2 + a56^*m^*y + a7^*y^*c + a8^*c^*m$$

$$m' = a9^*c + a10^*m + a11^*y + a12^*c^2 + a13^*m^2 + a14^*y^2 + a15^*m^*y + a16^*y^*c + a17^*c^*m$$

$$y' = a18^*c + a19^*m + a20^*y + a21^*c^2 + a22^*m^2 + a23^*y^2 + a24^*m^*y + a25^*y^*c + a26^*c^*m \qquad (3)$$

As seen from this, the main density of the actual ink representing a particular color is expressed as a secondary equation of spectral densities c, m, y converted for complementary colors from input r, g, b, so that the non-linearity of density for superposed ink recording is approximated by a secondary equation. The 27 correction factors are determined to produce a minimum color difference in the average sense of the word against as many sets of color patches (c, m, y) as in the linear masking.

Also, tertiary or higher-order equations have been suggested to improve the approximation accuracy against the non-linearity of the superposed density.

The full-color reproduction on hard copy is realizable in principle by the three primary colors of C, M and Y. Actually, however, the gray scale by the combination of three colors C, M and Y is based on the balance therebetween. It is difficult to strike a perfect balance for all gradations, as the gray scale is often colored differently. Further, the density of black is often too low, or dignity of black is often insufficient with a color attached to the periphery of a pixel by displacement of the three-color pixels. In applications aimed at a high image quality, therefore, four-color recording, including black is used.

A conventional method to attain the four-color recording using black is called UCR (under color removal). In this method, the black ink density K is set to a given value less than amount of the ink lowest in density among Y, M and C; the black ink density thus set is subtracted from the density of each ink of Y, M and C.

Equations (4) represent an example of 100% UCR. Assuming that the ink densities of the three primary colors are C, M, Y and the density of black ink K, the value K is set to the minimum density among C, M and Y, the C, M, Y inks used for recording are expressed by C1, M1, Y1 respectively.

$$K = \text{minimum}(Y, M, C), \quad C1 = C - K$$

$$M1 = M - K,$$
$$Y1 = Y - K \tag{4}$$

The conventional linear masking technique, in which the freedom is so limited that there are only nine correction factors to be optimized, facilitates optimization of the correction factors. Also, the comparatively small scale of hardware makes the conventional technique effective in an application not requiring a very faithful color reproduction. In view of fact that the non-linearity of density in the superposed color recording is corrected by linear operation, however, it is difficult to determine such a correction factor as to reduce the color difference over the entire color space, resulting in the problem of a great color difference with a target color.

The high-order masking technique, in which the approximating non-linearity of color reproduction reduces the color difference over the entire color space, is effective in attaining a faithful color reproduction. Since this method requires correction factors as many as 57 even for the third-order masking, many multipliers are required, thereby leading to a very large hardware scale. Even the simplest configuration of secondary order has 27 correction factors and is still very large in hardware scale.

Further, the high-order masking technique, with its high number of factors, has the problem that it is very difficult to determine an optimum correction factor by repeating recording tests or numerical calculations.

The problem of the conventional UCR (under color removal) technique for four-color reproduction, on the other hand, is that the four-color conversion with linear operation against the actual ink having a non-linear density in superposed color recording, rules out an accurate density forecast, with the result that the color obtained by superposing the four color inks is displaced from a target color.

As a consequence, a sufficiently faithful overall color reproduction cannot be attained simply by improving the masking accuracy in a high-order masking or the like, since the error due to UCR (under color removal) is considerable.

SUMMARY OF THE INVENTION

In view of this, an object of the present invention is to provide a method of color correction capable of UCR compensation for non-linearity of superposed color densities. Non-linear color correction meeting the non-linearity of the superposed densities at high accuracy in substantially the same scale as the conventional linear UCR and linear masking techniques.

According to the present invention, in order to obviate the above-mentioned problems, there is provided a color correction method comprising firs conversion means for converting the C, M, Y density information by a monotonously incremental non-linear function with a similarly monotonously incremental derivative, matrix means, and second conversion means for converting the same density information by a monotonously incremental non-linear function with a monotonously decremental derivative.

According to another aspect of the invention, there is provided four-color reproduction means comprising first conversion means for converting the C, M, Y information by a monotonously incremental non-linear function with as similarly monotonously incremental derivative, second conversion means for effecting the conversion with a monotonously incremental non-linear function with a monotonously decremental derivative, and black separation means, subtraction means and matrix means interposed between the first and second conversion means for controlling the densities of the four inks to implement color recording.

A correction factor is determined, as in the conventional linear masking method, by use of the relationship between the density of each of the three primary colors and the chromaticity recorded.

DESCRIPTION OF THE PREFERRED EMBODIMENTS

A configuration of a thermal transfer recording system of the sublimation type according to an embodiment of the present invention will be explained below.

Figure 1:
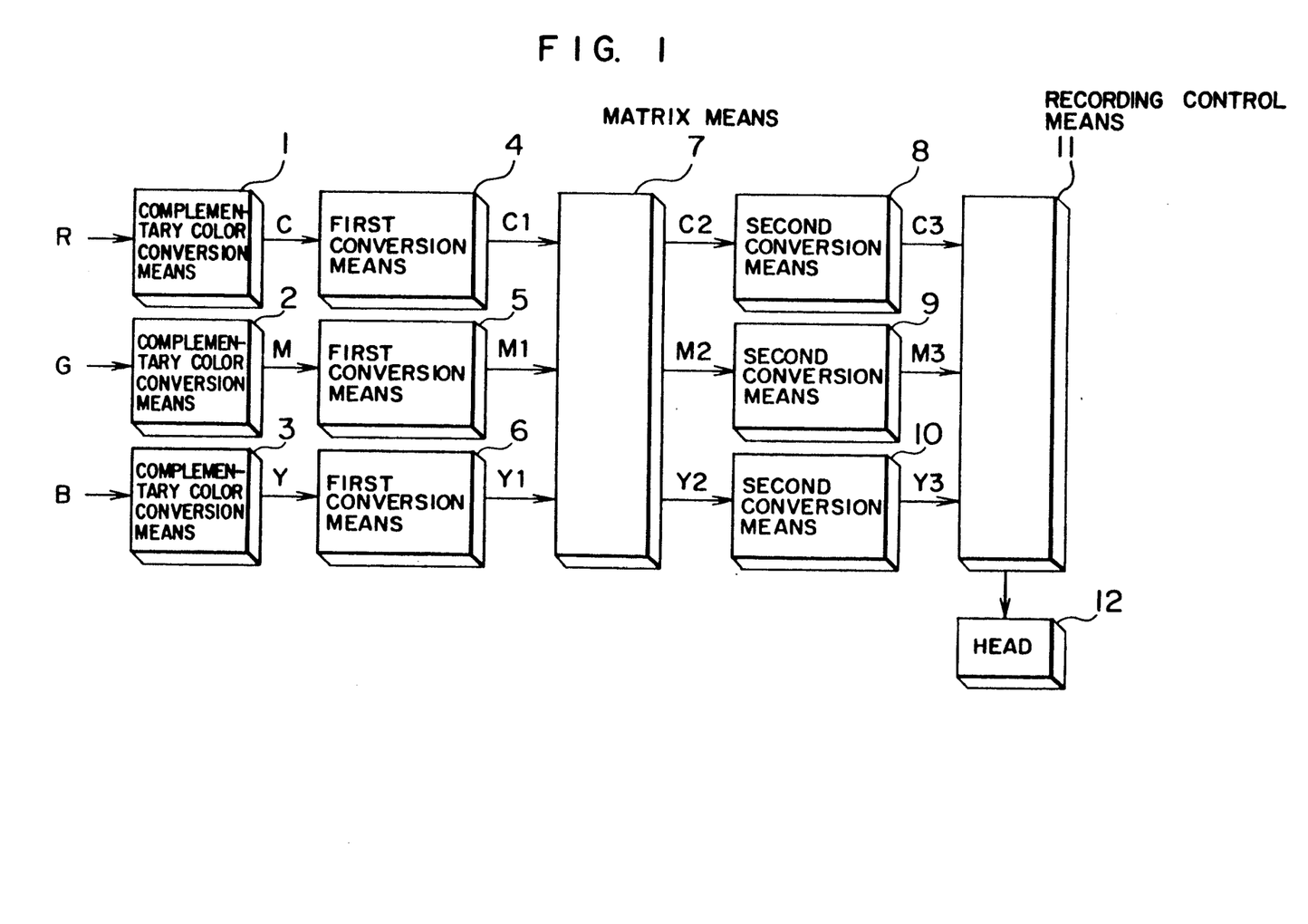
FIG. 1 is a diagram showing a block configuration of a color image forming apparatus according to an embodiment of the present invention.

FIG. 1 shows an embodiment of a color image forming apparatus according to the present invention intended to record the colors of the R, G, B input signals faithfully by means of ink.

Reference numerals 1, 2, 3 designate complementary color conversion means for converting the input luminance information R, G, B in respect of complementary colors to produce density information C, M, Y, numerals 4, 5, 6 first conversion means for converting the output density information C, M, Y non-linearly, numeral 7 linear matrix means for producing the sum of products between the outputs of the first conversion means 4, 5, 6 and the outputs C1, M1, Y1 to produce C2, M2, Y2, numerals 8, 9, 10 second conversion means for converting the outputs of the matrix means 7 in non-linear fashion, and numeral 11 recording control means for effecting the gradation color recording by the output density information C3, M3, Y3, and numeral 12 a head including a thermal head for controlling the amount of dyes transferred by the amount of heat for the purpose of recording.

Figure 2:
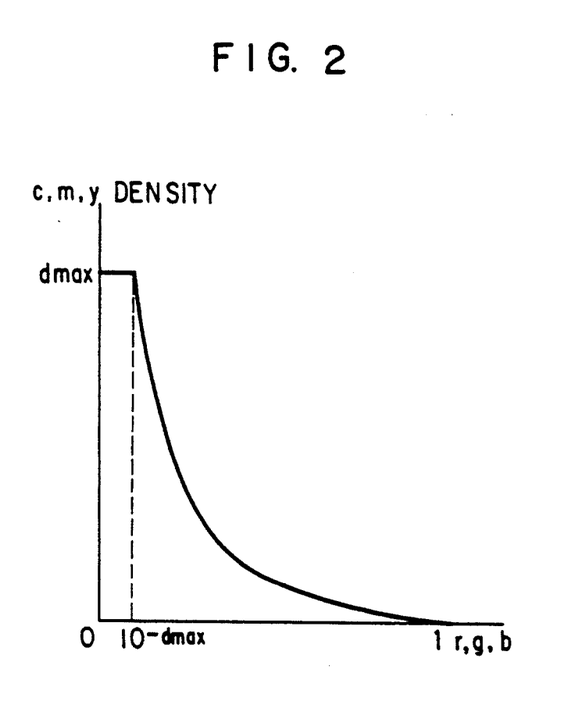
FIG. 2 is a diagram showing the characteristic of complementary color conversion.

The conversion in complementary colors is to convert the luminance information r, g, b based on the principle of additive color mixture into density information c, m, y to be used as a color printer input based on the principle of subtractive color mixture, and is defined as shown by FIG. 2 and equation (5) below when the maximum density of each color is assumed to be dmax.

If $0 < r, g, b < 10^{-dmax}$, $c = \log(1/r)$ $m = \log(1/g)$ $y = \log(1/b)$

If $r, g, b > 10^{-dmax}$, $c = dmax$ $m = dmax$ $y = dmax$ \hfill (5)

In recording on the principle of subtractive color mixture, the three primary colors of c, m, y are recorded by superposition. In the process, the y ink layer absorbs light B mainly, the m ink layer light G mainly, and c ink layer light R mainly, so that a given color in the color reproduction rang is reproduced by the amount of dye. Actually, however, the c ink absorbs not only R but G. In other words, the actual c ink contains a considerable amount of m component other than the real c component. Therefore, a blue color produced by combining the c and m inks contains an excessive amount of m component and thus becomes rather purplish.

Masking is a process for reducing the amount of the m ink by an amount equal to magenta contained in the c ink.

For this process is be carried on correctly, it is necessary that the rule of addition and subtraction of density be established between the magenta components of c and m inks.

Figure 3:
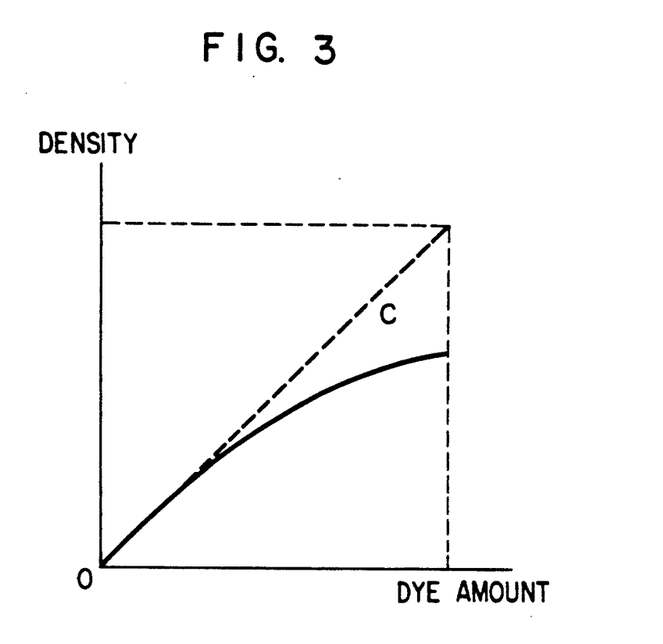
FIG. 3 is a diagram showing the relationship between the dye amount of ink and density.
Figure 4:
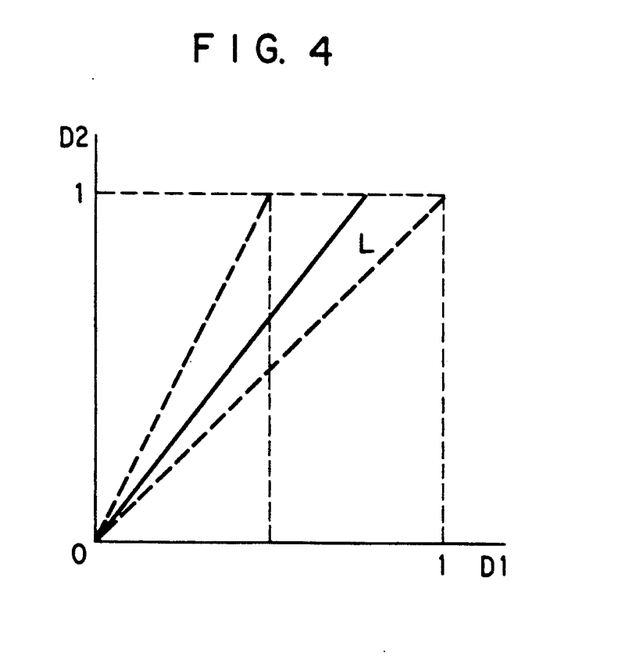
FIG. 4 is a diagram showing the density ratio with the amount of dye doubled.

In actual ink, however, linearity does not generally hold true. FIG. 3 illustrates the relationship between the amount of dye and recording density in the actual thermal transfer recording of sublimation type. From this, it is seen that the density does not follow the increase in the amount of dye. FIG. 4 shows a plotting of a density D1 for recording with a certain dye amount, and a combined density D2 for the recording with the same ink superposed in two layers. This graph represents a shape resembling a straight line passing the origin with an inclination intermediate 1 and 2. It is seen also from this graph that the density does not double with doubly superposed recordings.

Assume here that the density for recording with a given dye amount p is D1 and that with a double dye amount D2, and this relationship is expressed by equations below.

$D1 = f(p), D2 = f(2*p)$ \hfill (6)

If the inclination of the straight line is given as k, $f(2*p) = k*f(p), 1 < k < 2$ \hfill (7)

Thus, one of the solutions satisfying the equation (7) is given as $D = f(x) = x^{1/a}$ \hfill (8)

where $a = (\log 2/\log k) > 1$

The equation (8) thus well approximates to the relationship of FIG. 3. Also, solving the equation (8) in reverse way leads to $x = D^a$ \hfill (9)

The equation (9) represents the conversion of an input density into a space of dye amount where linearity holds true. The equation (8), on the other hand, indicates the conversion for returning the space of dye amount to density space.

The relationships of equations (8) and (9) depend to some degree on the recording method of the printer or ink material. The monotonous increase of both the function and derivative as seen in equation (9), and the monotonous increase in the function with a monotonously decremental derivative as expressed by equation (8), however, is a common trend observed in many dyes or pigments.

In this embodiment, the first conversion means 4, 5, 6 are represented by equation (9) and the second conversion means 8, 9, 10 by equation (8).

The matrix means 7, which represents a coordinate conversion in a color space equivalent to the amount of dyes permitting the linearity, may use a linear matrix and may be expressed by equations (10)) below.

$C2 = a0*C1 + a1*M1 + a2*Y1$ $M2 = a3*c1 + a4*M1 + a5*Y1$ $Y2 = a6*C1 + a7*M1 + a8*Y1$ \hfill (10)

It will be seen from above that when the first conversion means 4, 5, 6, the matrix means 7 and the second conversion means 8, 9, 10 are integrated and the color correction system according to the present invention is considered a non-linear masking, the input-output relationship shown in equations (11) is obtained.

It is clear that in order to have equation (11) function as the basis for performing the asking for eliminating the unnecessary components of optical spectrums of inks or unnecessary spectrum absorption portions of inks, it is necessary that matrix correction factors other than diagonal factors usually take negative values and the diagonal factors take values higher than "1" in order to compensate for shortages in ink densities. When a ray balance holds in that three color inks of an identical density are superposed with each other to produce a gray balance, each row of correction factors of the matrix are summed to take a value of "1". thus, the above embodiment determines the matrix correction factors a0 so as to satisfy the following relationship:

$C3 = (a01C^1 + a1*M^1 + a2*Y^1)^{1/a}$ $M3 = (a3*C^1 + a4*M^1 + a5*Y^1)^{1/a}$ $Y3 = (a6*C^1 + a7*M^1 + a8*Y^1)^{1/a}$ \hfill (11)

where $a > 1$

As a result, the present invention makes possible a color correction which is both flexible and high in accuracy against the non-linearity of superposed density with substantially the same freedom as in the conventional linear masking requiring a total of ten factors including linear correction factors a0 to a8 and a factor a representing the non-linearity of the superposed density.

In determining a correction factor, the values a0 to a8 and a are optimized by use of the minimum square method for minimizing the square mean of errors between a required color and a color reproduced by the printer for each of 100 representative colors extracted as uniformly as possible from the color space reproducible by the particular ink used.

According to the present embodiment, the color correction method of equation (11) is configured by the linear matrix operation using a ROM table and a sum-of-products circuit.

Figure 5:
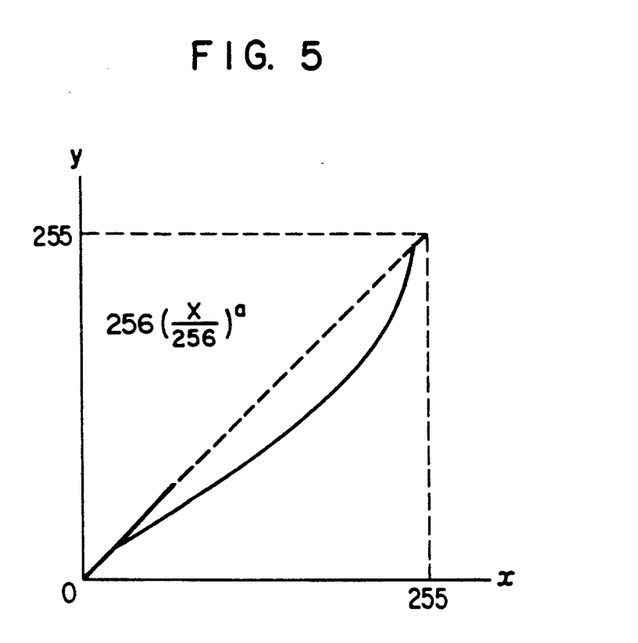
FIG. 5 shows the conversion characteristic of first conversion means.

The first conversion means 4, 5, 6 are configured by a ROM table for non-linear operation of $256*(x/256)^a$ ($0 \leq X < 255$) with 8-bit accuracy.

Figure 6:
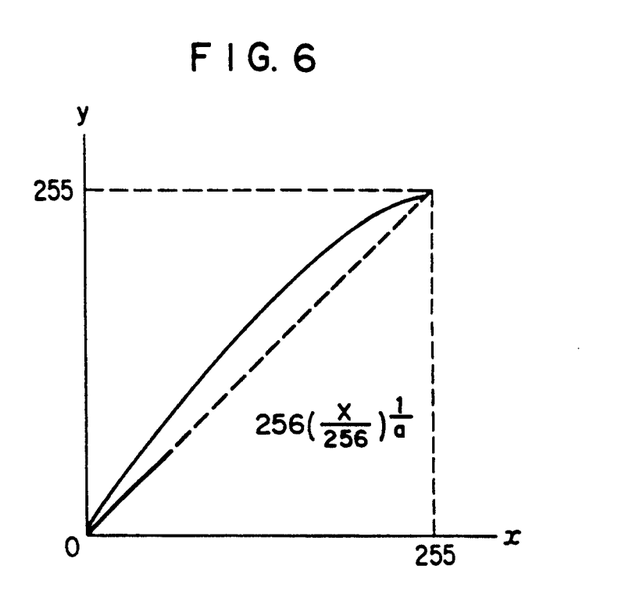
FIG. 6 shows the conversion characteristic of second conversion means.

The second conversion means 8, 9, 10 are also configured by a ROM table for the operation of $256*(x/256)^{1/a}$ ($0 \leq X < 255$) as shown in FIG. 6.

Figure 7:
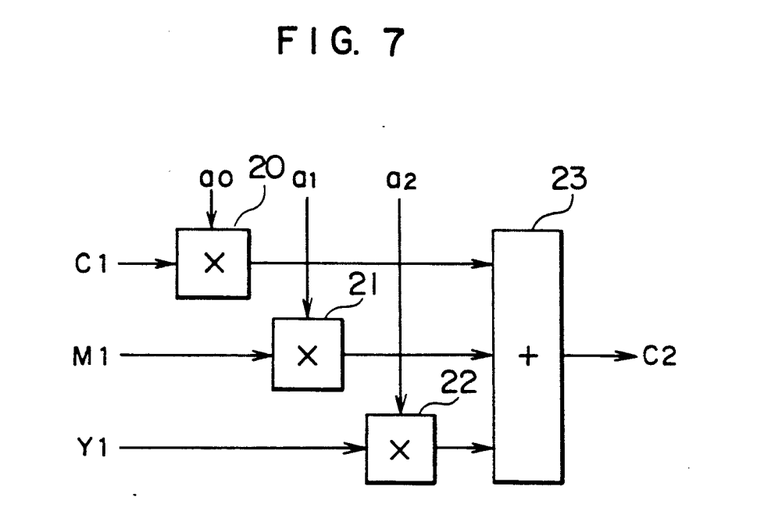
FIG. 7 is a diagram showing a configuration of matrix means.

FIG. 7 shows an example for carrying on the operation on C2 with one third of a specific configuration of the matrix means 7, in which M2 and Y2 may also be operated with the same configuration. Numerals 20, 21, 22 designate coded multiplier means for producing the product of each of C1, M1 and Y1 and the correction factor thereof respectively, and numeral 23 coded adder means for calculating the sum of outputs of the multiplier means 20, 21, 22.

Now, a method of determining the ten correction factors including a0 to a8 and the non-linear conversion factor a will be described.

The colors distributed at regular intervals within a color reproduction range defined by the maximum ink density and the document density of plane area are selected in the number from several tens to several hundreds, and each of these colors is actually recorded to prepare color patches. The square of the difference between a chromaticity measured by the color difference meter from these color potables and the chromaticity expressed by the R, G, B inputs is averaged out for all the color chips, and the ten correction factors are set to minimize the average.

Equation (12) shows an example of the correction factor determined by the thermal transfer printer of sublimation type.

$$a = 1.6 \quad (12)$$

$$\begin{bmatrix} a0 & a1 & a2 \\ a3 & a4 & a5 \\ a6 & a7 & a8 \end{bmatrix} = \begin{bmatrix} 1.09 & -0.03 & -0.06 \\ -0.32 & 1.25 & 0.07 \\ 0.12 & -0.69 & 1.57 \end{bmatrix}$$

The first conversion means 4, 5, 6 and the second conversion means 8, 9, 10, though configured of individual tables according to the present embodiment, may alternatively be constructed as a part of other conversion tables connected in cascade.

Also, according to the present embodiment, instead of making up matrix means 7 including a multiplier and an adder in parallel operation, a single multiplier may be used by time division. Further, the first conversion means 4, 5, 6, the second conversion means 8, 9, 10 and the matrix means 7 may be configured of a ROM table expressed by equations (11) collectively.

Now, a configuration of a second embodiment of the present embodiment will be explained.

Figure 8:
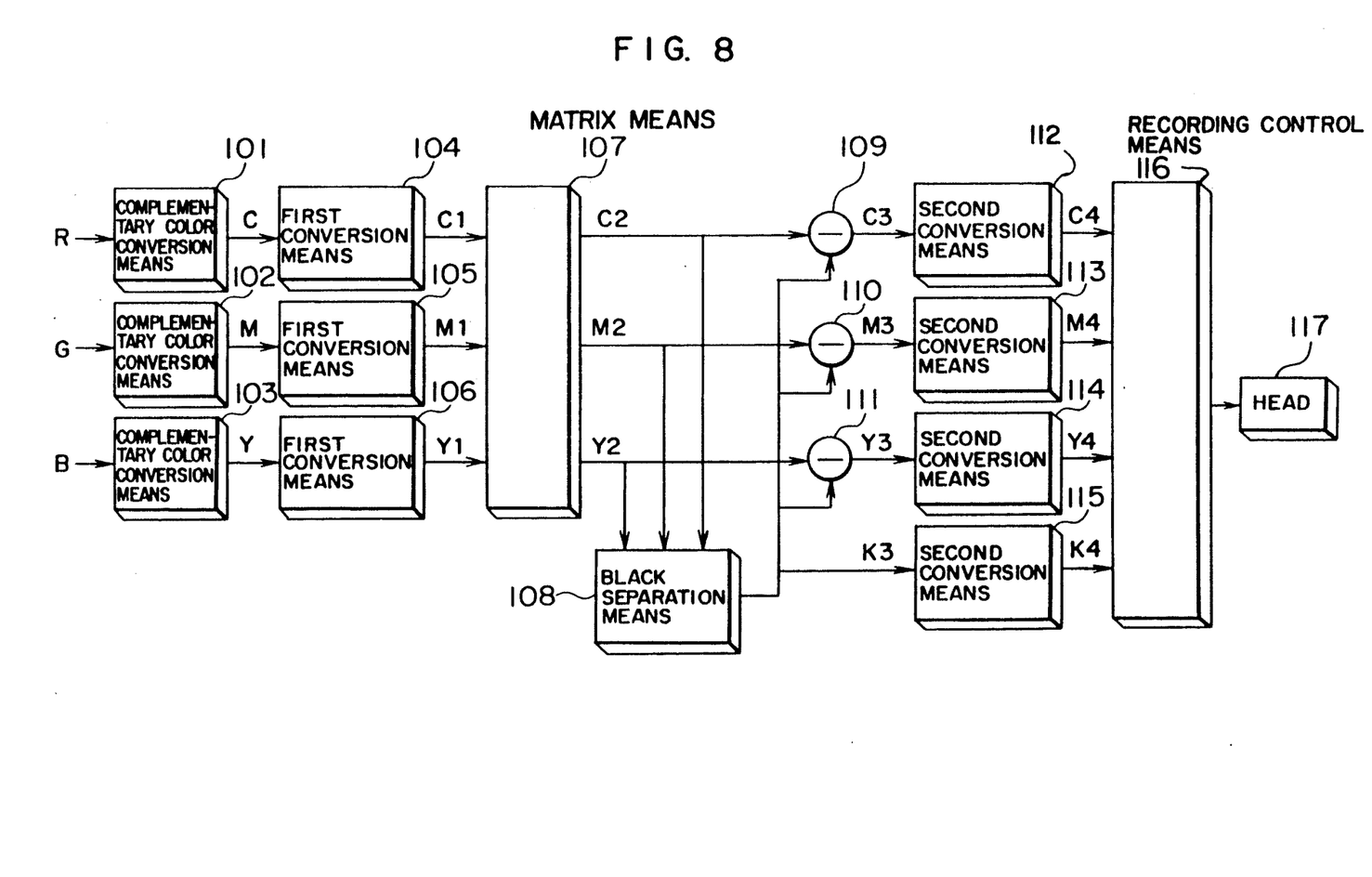
FIG. 8 is a diagram showing a block configuration of a color image forming apparatus according to a second embodiment of the present invention.

FIG. 8 shows a color image forming apparatus according to an embodiment of the present invention intended to record the colors associated with the R, G, B input signals faithfully by use of four-color inks.

Numerals 101, 102, 103 designate complementary color conversion means for converting the complementary colors of the luminance information R, G, B applied thereto to produce density information C, M, Y; numerals 104, 105, 106 first conversion means for converting the input density information C, M, Y in non-linear fashion respectively; numeral 107 linear matrix means for computing the sum of products between the outputs C1, M1, Y1 of the first conversion means 104, 105, 106 and the correction factors and producing C2, M2, Y2; numeral 108 black separation means for separating an achromatic color from the outputs C2, M2, Y2 of the matrix means 107 and preparing the black signal K3; numerals 109, 110, 111 subtraction means for subtracting the black signal K3 from the outputs C2, M2, Y2 of the matrix means 107 respectively numerals 112, 113, 114, 115 second conversion means for converting each of the outputs of the subtraction means 109, 110, 111 and the black signal in non-linear fashion respectively; numeral 116 recording control means for effecting gradation color recording by means of the main density information C4, M4, Y4, K4 produced from the second conversion means 112, 113, 114, 115 respectively; and numeral 17 a head for controlling the dye amount transferred in accordance with the heat amount of a thermal head by use of the recording control means 116.

The complementary color conversion means 101, 102, 103, the first conversion means 104, 105, 106 and the matrix means 107, like in the first embodiment, are for converting and processing a density signal into a color space of the dye amount where a linear characteristic holds true.

In the UCR (under cover removal) of the present invention, which is based on the fact that linear operation is possible by converting the density into a space of the dye amount where a linear characteristic holds true, the black separation means 108 is represented by equation (13) and the subtraction means 109, 110, 111 by equation (14) where the amount of UCR is assumed to be Q ($0 < Q < 1$) (UCR of 100*%).

$$K3 = Q*\text{minimum (C2, M2, Y2)} \quad (13)$$

These four-color dye amounts are converted into actual ink densities C4, M4, Y4, K4 of the four colors including color correction by the second conversion means 112, 113, 114, 115 for conversion into four colors. The black separation means 108 according to the present embodiment operates the equation (13), and the subtraction means 109, 110, 111 the equation (14).

To summarize, the conversion characteristics of the present invention are given as $C2 = a0*Ca + a1*Ma + a2*Ya$ $M2 = a3*Ca + a4*Ma + a5*Ya$ $Y2 = a6*Ca + a7*Ma + a8*Ya$ $K3 = Q*\text{minimum (C2, M2, Y2)} \ (a > 1, 0 < Q < 1)$ $C3 = C2 - K3, M3 = M2 - K3, Y3 = Y2 - K3$ $$C4 = C3^{1/a}, \quad M4 = M3^{1/a}$$

$$Y4 = Y3^{1/a}, \quad K4 = K3^{1/a} \tag{15}$$

The first conversion means 104, 105, 106 and the second conversion means 112, 113, 114, 115, like the first embodiment, are configured by use of a ROM table, and so is the matrix means 107.

Figure 9:
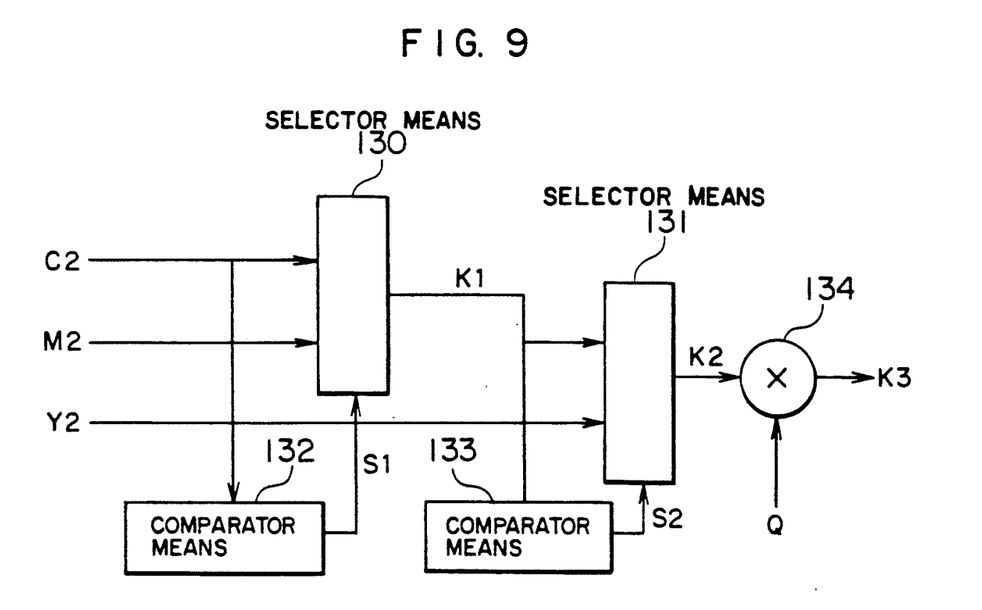
FIG. 9 shows a configuration of black separation means.

FIG. 9 shows a specific configuration of the black separation means. Numerals 130, 131 designate selection means, numerals 132, 133 comparator means, and numeral 134 multiplier means.

First, the comparator means 132 compares C2 and M2 with each other, and when C2 is smaller, activates the output S1. The selector means 130 selects C2 when S1 is active, and M2 otherwise, thereby producing minimum (C2, M2) to K1. The comparator means 133 and the selector means 131 operate the same way to produce minimum (C2, M2, Y2) to K2. Further, the multiplier means 134 multiplies a factor Q in the range between 0 and 1 for setting the amount of UCR to produce K3.

By means of the aforementioned configuration, the color image forming apparatus according to the present embodiment has a non-linear characteristic of the superposed density with substantially the same freedom as the conventional linear masking as it has a total of ten factors including linear correction factors a0 to a8 and a factor representing the non-linearity of the superposed density. The apparatus according to the present invention is thus capable of color correction more flexibly and more accurately than the high-order masking based on polynomial approximation, and in addition, is adapted for four-color conversion high in accuracy against the non-linearity of the superposed density.

Now, a third embodiment of the present invention will be explained.

Figure 10:
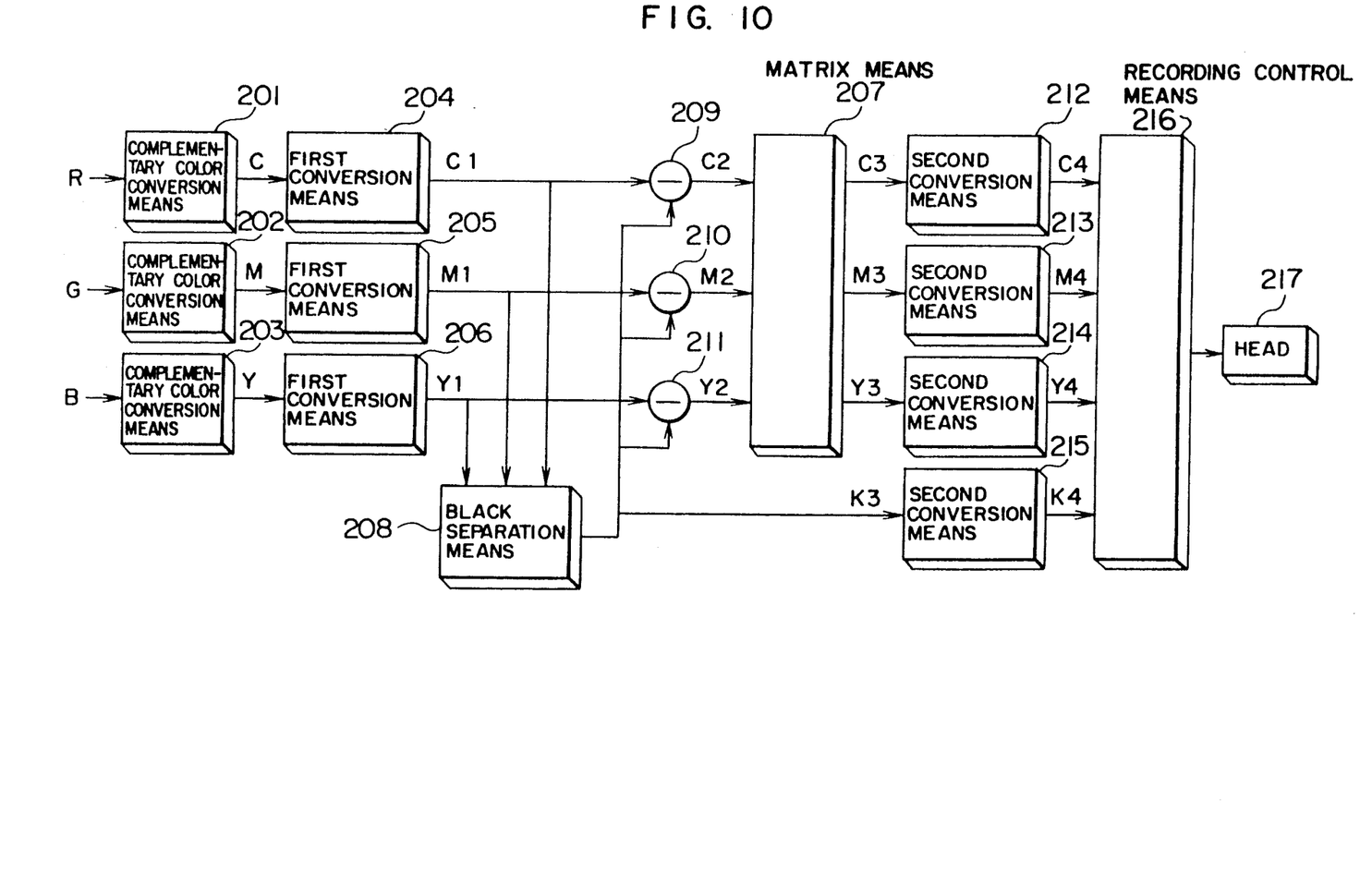
FIG. 10 is a diagram showing a block configuration of a color image forming apparatus according to a third embodiment of the present invention.

FIG. 10 is a diagram showing a color image forming apparatus for recording the colors of R, G, B input signals faithfully by use of ink.

Numerals 201, 202, 203 designate complementary color conversion means, numerals 204, 205, 206 first conversion means, numeral 207 linear matrix means, numeral 208 black separation means, numerals 209, 210, 211 subtractor means, numerals 212, 213, 214, 215 second conversion means, numeral 216 recording control means, and numeral 217 a head. Each means included in this embodiment is equivalent to corresponding means making up the second embodiment.

The operation of this embodiment will be explained below.

The R, G, B input signals are converted into spectral densities C, M, Y by the complementary color conversion means 201, 202, 203, and further into the dye amounts C1, M1, Y1 making the linearity effective by the first conversion means 204, 205, 206. The dye amounts C1, M1, Y1 of the spectral densities are operable in linear fashion permitting UCR by linear subtraction. If the minimum of the dye amounts C1, M1, Y1 is multiplied by the UCR factor Q to produce a black signal K3 through the black separation means and K3 is removed from C1, M1, Y1 by the subtractor means 209, 210, 211, therefore, the dye amounts C2, M2, Y2 subjected to UCR are obtained. Further, the dye amounts C3, M3, Y3 of the actual ink are calculated by the matrix means 7, and the actual ink densities C4, M4, Y4, K4 are produced by the second conversion means 212, 213, 214, 215.

The black separation means 208 and the matrix means 207 according to the present embodiment both provide a processing operation in a linear color dye space.

The aforementioned operation is expressed by equations below.

$$C1 = Ca, \quad M1 = Ma, \quad Y1 = Ya \quad (a > 1)$$

$$K3 = Q^* \text{minimum} (C1, M1, Y1) \quad (0 < Q < 1)$$

$$C2 = C1 - K3, \quad M2 = M1 - K3, \quad Y2 = Y1 - K3$$

$$C4 = (a0^*C2 + a1^*M2 + a2^*Y2)^{1/a}$$

$$M4 = (a3^*C2 + a4^*M2 + a5^*Y2)^{1/a}$$

$$Y4 = (a6^*C2 + a7^*M2 + a8^*Y2)^{1/a}$$

$$Y4 = K3^{1/a} \tag{16}$$

The aforementioned configuration makes possible both a highly-accurate four-color conversion and the correction higher in flexibility and accuracy than the high-order masking using a multinomial approximation against the non-linearity of the superposed densities with substantially the same small freedom as the conventional linear masking having a total of the factors including the linear correction factors a0 to a8 and a representing the non-linearity of the superposed densities. Also, the correction factors may be determined equivalently to the first embodiment.

Now, a fourth embodiment of the present invention will be explained.

Figure 11:
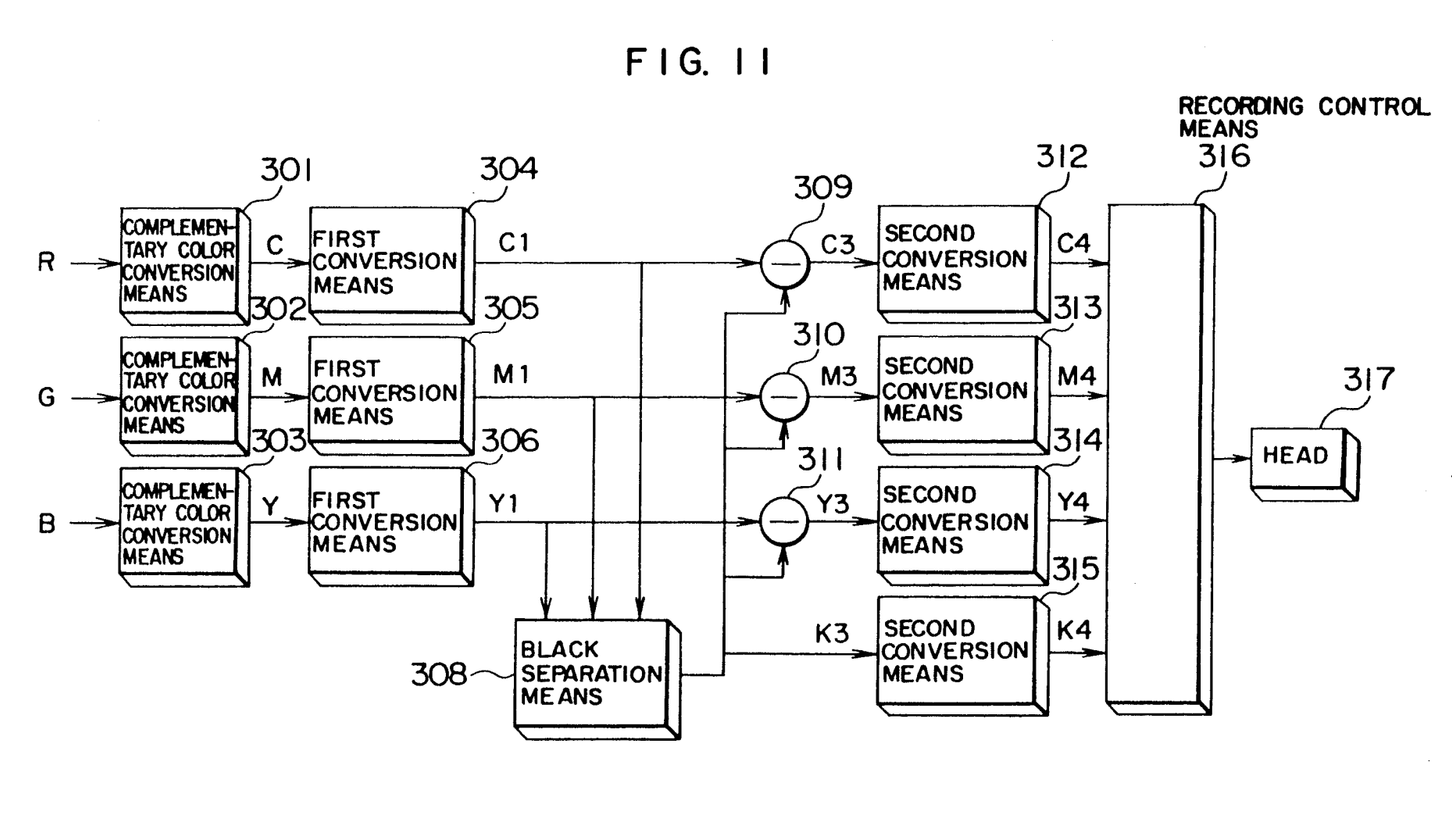
FIG. 11 is a diagram showing a block configuration of a color image forming apparatus according to a fourth embodiment of the present invention.

FIG. 11 shows a color image forming apparatus for recording with four-color inks without color correction against the R, G, B input colors according to an embodiment of the present invention.

Numerals 301, 302, 303 designate complementary color conversion means, 304, 305, 306 first conversion means, numeral 308 black separation means, 309, 310, 311 subtraction means, 312, 313, 314, 315 second conversion means, 316 recording control means, and 317 a head. Each of the means included in this embodiment is equivalent to corresponding means making up the second embodiment.

The R, G, B input signals are converted into spectral densities C, M, Y by the complementary color conversion means 301, 302, 303, and further into the dye amounts C1, M1, Y1 making the linearity effective by the first conversion means 304, 305, 306 respectively. Since the dye amounts C1, M1, Y1 of spectral densities are operable in linear fashion, the UCR by linear subtraction is possible. In the black separation means, the minimum one of dye amounts C1, M1, Y1 is multiplied by the UCR factor Q to produce a black signal K3, which is removed from C1, M1, Y1 by the subtraction means 309, 310, 311 thereby to produce dye amounts C3, M3, Y3 subjected to UCR. The second conversion means 312, 313, 314, 315 produce actual ink densities C4, M4, Y4, K4. The black separation means according to the present embodiment represents a processing operation in a linear dye amount space.

The above-mentioned operation is expressed by equations given below.

$$C1 = Ca, \quad M1 = Ma, \quad Y1 = Ya \quad (a > 1)$$

$$K3 = Q^* \text{minimum} (C1, M1, Y1)(0 < Q < 1)$$

$$C3 = C1 - K3, \quad M3 = M1 - K3, \quad Y3 = Y1 - K3$$

$$C4 = C3 1/a' M4 = M3^{1/a}$$

$$Y4 = Y3 1/a, K4 = K3^{1/a} \quad (17)$$

It is seen from the aforementioned configuration that a four-color conversion high in accuracy meeting the non-linearity of the superposed densities is possible.

Although the above-mentioned embodiment has the first and second conversion means configured of separate tables, one conversion table may be integrated with the other.

Also, the matrix means, which is configured using parallel operation of a multiplier and an adder in the aforementioned embodiment, may alternatively use a multiplier in time division.

The present invention, embodiments of which are explained above with reference to a printer, is obviously applicable with equal effect also to a full-color duplicator or other color image forming apparatus.

According to the present invention, as compared with the high-order masking meeting the non-linearity by adding several tens of freedom to the linear masking, a highly accurate correction meeting the non-linearity is possible in more flexible fashion than the high-order masking simply by adding a single freedom to the non-linearity.

As a result, unlike the high-order masking requiring an unavoidably large size of hardware, a highly-accurate color correction system equivalent to the high-order masking is realized with a small hardware configuration equivalent to the linear masking.

Also, the small freedom to be determined for realizing color correction makes it possible to determine a correction factor with high accuracy in a small number of times of repetitions.

According to the present invention, a highly-accurate color correction and four-color conversion by precise UCR meeting the non-linearity of the superposed densities is realized by converting the ink density into a linear space of dye amount.

Further, the four-color conversion and the color correction may be effected integrally with each other with a small configuration.

We claim:

1. A color image forming apparatus comprising:
    means for recording a color image on a print medium by employing a plurality of colored inks;
    first conversion means including is first look-up table containing a monotonously incremental non-linear function with a monotonously incremental derivative, for converting color density information for C, M, YU (cyan, magenta, yellow), obtained by complementary color conversion of R, G, B (red, green, blue) luminance information, by said monotonously non-linear function with said monotonously incremental derivative to provide converted outputs C1, M1, Y1;
    matrix means receiving said converted outputs C1, M1, Y1 or the first conversion means for performing a matrix operation with at least one matrix diagonal element to produce outputs C2, M2, Y2;
    second conversion means including a second look-up table containing an inverse function of said non-linear function, said inverse function being a monotonously incremental non-linear function with a monotonously decremental derivative, for converting the outputs C2, M2, Y2 to produce ink control outputs C3, M3, Y3 by said monotonously incremental non-linear function with said monotonously excremental derivative; and
    means or controlling ink densities of said colored inks applied to said print medium in accordance with the outputs of the second conversion means or color recording.

2. A color image forming apparatus according to claim 1, wherein said non-linear function of said first look-up table is represented by $y = x^1$, and said non-linear function of said second look-up table is represented by $y = x^{1/a}$ where x is an input signal level, y an output signal level, and a is greater than 1 and is a variable representing the degree of non-linearity.

3. A color image forming apparatus comprising:
    means for recording a color image on a print medium by employing a plurality of colored inks;
    first conversion means including a first look-up table containing a monotonously incremental non-linear function with a monotonously incremental derivative, for converting C, M, Y (cyan, magenta, yellow) density information by said monotonously non-linear function with said monotonously incremental derivative to provide converted outputs C1, M1, y1;
    black separation means for selecting a minimum output among the outputs C1, M1, y1 to produce a black level signal based upon the selected minimum output;
    subtraction means for subtracting outputs of the black separation means from the outputs C1, M1, and Y1 to provide subtraction outputs; and
    second conversion means including a second look-up table containing an inverse function of said non-linear function, said in verse function being a monotonously incremental non-linear function with a monotonously decremental derivative, for converting the outputs o the subtraction means and the outputs of h black separation means to produce ink control outputs C3, M3, Y3 by said monotonously incremental non-linear function with said monotonously detrimental derivative; and
    means for controlling four color ink densities of said color inks applied to said print medium in accordance with the outputs of the second conversion means for color recording.

4. A color image forming apparatus according to claim 3, wherein said non-linear function of said first look-up table is represented by $y = x^1$, and said non-linear function of said second look-up table is represented by $y = x^{1/a}$ where x is an input signal level, y an output signal level, and a is greater than 1 and is a variable representing the degree of non-linearity.

5. A color image forming apparatus comprising:
    means for recording a color image on a print medium by employing a plurality of colored inks;
    first conversion means including a first look-up table containing a monotonously incremental non-linear function with a monotonously incremental derivative, for subjecting color density information C, M, Y (cyan, agenda, yellow) to conversion by said monotonously non-linear function with said monotonously incremental derivative to provide converted outputs C1, M1, Y1;
    matrix means supplied with the conversion outputs C1, M1, and Y1 for effecting a matrix operation with at least one matrix diagonal element to provide outputs C2, M2, Y2;

black separation means for selecting a minimum output among the outputs C2, M2, Y2 of the matrix means to produce a black level signal based upon the selected minimum output;

subtraction means for subtracting the outputs of the black separation means from the outputs C2, M2, Y2 to provide subtraction outputs; and second conversion means including a second look-up table containing an inverse function of said non-linear function, said inverse function being a monotonously incremental non-linear function with a monotonously decremental derivative, for converting the outputs of the subtraction means and the outputs of the black separation means to produce ink control outputs C3, M3, Y3 by said monotonously incremental non-linear function with said monotonously decremental derivative; and means for controlling four-color ink densities of said colored inks applied to said print medium in accordance with the outputs o the second conversion means for color recording.

6. A color image forming apparatus according to claim 5, wherein said non-linear function of said first look-up table is represented by $y=x^a$, and said non-linear function of said second look-up table is represented by $y=x^{1/a}$ where x is an input signal level, y an output signal level, and a is greater than 1 and is a variable representing the degree of non-linearity.

7. A color image forming apparatus comprising:
means for recording a color image on a print medium by employing a plurality of colored inks;

first conversion means including a first look-up table containing a monotonously incremental non-linear function with a monotonously incremental derivative, for subjecting the color density information C, M, Y (cyan, magenta, yellow) to conversion with said monotonously non-linear function with said monotonously incremental derivative to provide conversion outputs C1, M1, Y1;

black separation means for selecting a minimum output among the outputs C1, M1, Y1 to produce a black level signal based upon the selected minimum output;

subtraction means for subtracting the outputs produced by the black separation means from the conversion outputs C1, M1, Y1 to provide outputs C2, M2, Y2;

matrix means supplied with outputs C2, M2, Y2 of the subtraction mans for effecting a matrix operation with at least one matrix diagonal element to provide matrix converted outputs; and second conversion means including a second look-up table containing an inverse function of said non-linear function, said inverse function being monotonously decremental derivative, for converting the outputs of the matrix means and the outputs C2, M2, Y2 of the black separation means to produce ink control outputs C3, M3, y3 by said monotonously incremental non-linear function with said monotonously decremental derivative; and means for controlling four-color ink densities of said colored inks applied to said print medium in accordance with outputs of the second conversion means to achieve color recording.

8. A color image forming apparatus according to claim 7, wherein said non-linear function of said first look-up table is represented by $=x^a$, and said non-linear function of said second look-up table is represented by $y=x^{1/a}$ where x is an input signal level, y an output signal level, and a is greater than 1 and is a variable representing the degree of non-linearity.

9. A color image forming apparatus comprising:
means for recording a color image on a print medium by employing a plurality of colored inks;

color conversion means for receiving and converting an input including three primary color information to produce non-linear color density information C, M, Y (cyan, magenta, yellow) of complementary colors of the three primary color information of said input;

first non-linear conversion means including a first look-up table containing a monotonously incremental non-linear function with a monotonously incremental derivative, for converting said non-linear color density information for C, M, Y by said monotonously incremental non-linear function with said monotonously incremental derivative to provide substantially linear converted outputs C1, M1, Y1;

matrix means for receiving and performing a linear operation upon said converted outputs C1, M1, Y1 of the first conversion means to produce substantially linear matrix outputs C2, M2, Y2,;

second non-linear conversion means including a second look-up table containing an inverse function of said non-linear function, said inverse function being a monotonously incremental non-linear function with a monotonously decremental derivative, for converting said substantially linear matrix outputs C2, M2, Y2 to produce non-linear ink control outputs C3, M3, Y3 by said monotonously incremental non-linear function with said monotonously decremental derivative; and recording control means for controlling ink densities of said colored inks applied to said print medium in accordance with the outputs C3, M3, y3 of the second non-linear conversion means for color recording.

10. A color image forming apparatus according to claim 9, wherein said non-linear function of said first look-up table is represented by $y=x^a$, and said non-linear function of said second look-up table is represented by $y=x^{1/a}$ where x is an input signal level, y an output signal level, and a is greater than 1 and is a variable representing the degree of non-linearity.

11. A color image forming apparatus comprising:
means for recording a color image on a print medium by employing a plurality of colored inks;

color conversion means for receiving and converting an input including three in primary color information to produce non-linear color density information C, M, Y (cyan, magenta, yellow) of complementary colors of the three primary color information of said input;

first non-linear conversion means including a first look-up table containing a monotonously incremental non-linear function with a monotonously incremental derivative, for converting said non-linear color density information by said monotonously incremental non-linear function with said monotonously incremental derivative to provide substantially linear converted outputs C1, M1, Y1;

black separation means for selecting a minimum output among the outputs C1, M1, Y1 to produce a substantially linear output comprising a black level signal based upon the selected minimum output;

subtraction means for subtracting outputs of the black separation means from the outputs C1, M1, and Y1 to provide substantially linear subtraction outputs; and second non-linear conversion means including a second look-up table containing an inverse function of said non-linear function, said inverse function being a monotonously incremental non-linear function with a monotonously decremental derivative, for converting the outputs of the subtraction means and the outputs of the black separation means to produce non-linear ink control outputs C3, M3, Y3 by said monotonously incremental non-linear function with said monotonously decremental derivative; and recording control means for controlling four color ink densities of said colored inks applied to said print medium in accordance with the outputs C3, M3, Y3 of the second non-linear conversion means for color recording.

12. A color image forming apparatus according to claim 11, wherein said non-linear function of said first look-up table is represented by $y = x^1$, and said non-linear function of said second look-up table is represented by $y = x^{1/a}$ where x is an input signal level, y an output signal level, and a is greater than 1 and is a variable representing the degree of non-linearity.

13. A color image forming apparatus comprising:

means for recording a color image on a print medium by employing a plurality of colored inks;

color conversion means for receiving and converting an input including three primary color information to produce non-linear color density information C, M, Y (cyan, magenta, yellow) of complementary colors of the three primary color information of said input;

first non-linear conversion means including a first look-up table containing a monotonously incremental non-linear function with a monotonously incremental derivative, for converting said non-linear color density information C, M, Y (cyan, magenta, yellow) by said monotonously incremental non-linear function with said monotonously incremental derivative to provide substantially linear converted outputs C1, M1, Y1;

matrix means for receiving and performing a linear operation upon the converted outputs C1, M1, and Y1 to provide substantially linear matrix outputs C2, M2, Y2;

black separation means for selecting a minimum output among the outputs C2, M2, Y2 of the matrix means to produce a substantially linear output comprising a black level signal based upon the selected minimum output;

subtraction means for subtracting the outputs of the black separation means from the outputs C2, M2, Y2 to provide substantially linear subtraction outputs; and second non-linear conversion means including a second look-up table containing an inverse function of said non-linear function, said inverse function being a monotonously incremental non-linear function with a monotonously decremental derivative, for converting the outputs of the subtraction means and the outputs of the black separation means to produce non-linear ink control outputs C3, m3, y3 by said monotonously incremental non-linear function with said monotonously decremental derivative; and recording control means for controlling four-color ink densities of said colored inks applied to said print medium in accordance with they outputs C3, M3, y3 of the second non-linear conversion means for color recording.

14. A color image forming apparatus according to claim 13, wherein said non-linear function of said first look-up table is represented by $y = x^a$, and said non-linear function of said second look-up table is represented by $y = x^{1/a}$ where x is an input signal level, y an output signal level, and a is greater than 1 and is a variable representing the degree of non-linearity.

15. A color image forming apparatus comprising:

means for recording a color image on a print medium by employing a plurality of colored inks;

color conversion means for receiving and converting an input including three primary color information to produce non-linear color density information C, M, Y (cyan magenta, yellow) of complementary colors of the three primary color information of said input;

first non-linear conversion means including a first look-up table containing a monotonously incremental non-linear function with a monotonously incremental derivative, for converting said non-linear color density information C, M, Y (cyan, magenta, yellow) with said monotonously incremental non-linear function with said monotonously incremental creative to provide substantially linear conversion outputs C1, M1, Y1;

black separation means for selecting a minimum output among the outputs C1, M1, Y1 to produce a substantially linear output comprising a black level signal based upon the selected minimum output;

subtraction mean for subtracting the outputs produced by the back separation means from the conversion outputs C1, M1, Y1 to provide substantially linear subtraction outputs C2, M2, Y2;

matrix means for receiving and performing a linear operation upon said outputs C2, M2, Y2 of the subtraction means to provide substantially linear matrix converted outputs; and second non-linear conversion means including a second look-up table containing an inverse function of said non-linear function, said inverse function being a monotonously incremental non-linear function with a monotonously decremental derivative, for converting said substantially linear outputs of the matrix means and the substantially linear outputs C2, M2, Y2 of the black separation means to produce non-linear ink control outputs C3, M3, Y3 by said monotonously incremental non-linear function with said monotonously decremental derivative; and recording control means for controlling four-color ink densities of said colored inks applied to said print medium in accordance with outputs C3, M3, y3 of the second non-linear conversion means to achieve color recording.

16. A color image forming apparatus according to claim 15, wherein said non-linear function of said first look-up table is represented by $y = x^1$, and said non-linear function of said second look-up table is represented by $y = x^{1/a}$ where x is an input signal level, y an output signal level, and a is greater than 1 and is a variable representing the degree of non-linearity.

* * * * *